(12) United States Patent
Nedwick et al.

(10) Patent No.: US 9,512,546 B2
(45) Date of Patent: Dec. 6, 2016

(54) DISPERSIBLE NONWOVEN

(71) Applicant: ROHM AND HAAS COMPANY, Philadelphia, PA (US)

(72) Inventors: Paul Nedwick, Lansdale, PA (US); Maureen B. Nunn, Lower Gwynedd, PA (US); Katherine Sue Rice, Glenside, PA (US)

(73) Assignee: ROHM AND HAAS COMPANY, Philadelphia, PA (US)

( * ) Notice: Subject to any disclaimer, the term of this patent is extended or adjusted under 35 U.S.C. 154(b) by 119 days.

(21) Appl. No.: 14/386,352

(22) PCT Filed: Apr. 3, 2013

(86) PCT No.: PCT/US2013/035081
§ 371 (c)(1),
(2) Date: Sep. 19, 2014

(87) PCT Pub. No.: WO2013/154879
PCT Pub. Date: Oct. 17, 2013

(65) Prior Publication Data
US 2015/0044375 A1    Feb. 12, 2015

Related U.S. Application Data

(60) Provisional application No. 61/622,725, filed on Apr. 11, 2012.

(51) Int. Cl.
| | | |
|---|---|---|
| *D04H 1/587* | (2012.01) |
| *B05D 3/10* | (2006.01) |
| *A47L 13/16* | (2006.01) |
| *C08F 20/06* | (2006.01) |
| *C08F 220/12* | (2006.01) |
| *D04H 1/64* | (2012.01) |
| *D06M 13/368* | (2006.01) |
| *D06M 15/263* | (2006.01) |
| *D21H 17/37* | (2006.01) |
| *D21H 17/43* | (2006.01) |
| *D21H 25/06* | (2006.01) |
| *D21H 17/35* | (2006.01) |
| *B05D 1/18* | (2006.01) |
| *B05D 3/02* | (2006.01) |
| *B05D 7/00* | (2006.01) |

(52) U.S. Cl.
CPC ............ *D04H 1/587* (2013.01); *A47L 13/16* (2013.01); *B05D 1/18* (2013.01); *B05D 3/0254* (2013.01); *B05D 3/107* (2013.01); *B05D 7/51* (2013.01); *C08F 20/06* (2013.01); *C08F 220/12* (2013.01); *D04H 1/64* (2013.01); *D06M 13/368* (2013.01); *D06M 15/263* (2013.01); *D21H 17/35* (2013.01); *D21H 17/37* (2013.01); *D21H 17/43* (2013.01); *D21H 25/06* (2013.01); *Y10T 442/20* (2015.04)

(58) Field of Classification Search
None
See application file for complete search history.

(56) References Cited

U.S. PATENT DOCUMENTS

| | | |
|---|---|---|
| 2,931,749 A | 4/1960 | Kine et al. |
| 3,951,893 A | 4/1976 | Gander |
| 4,117,187 A | 9/1978 | Adams et al. |
| 4,164,595 A | 8/1979 | Adams et al. |
| 4,242,408 A | 12/1980 | Evani et al. |
| 4,406,660 A | 9/1983 | Beiner et al. |
| 5,196,470 A | 3/1993 | Anderson et al. |
| 5,384,189 A | 1/1995 | Kuroda et al. |
| 5,451,432 A | 9/1995 | Lofton |
| 5,948,710 A | 9/1999 | Pomplun et al. |
| 6,548,592 B1 | 4/2003 | Lang et al. |
| 6,599,848 B1 * | 7/2003 | Chen .................. A61K 8/0208 15/209.1 |
| 7,276,459 B1 | 10/2007 | Lang et al. |
| 2007/0191803 A1 | 8/2007 | Diehl et al. |
| 2007/0254543 A1 * | 11/2007 | Bunyard ............. A61K 8/0208 442/59 |
| 2012/0258640 A1 | 10/2012 | Rice |

\* cited by examiner

*Primary Examiner* — Erma Cameron

(57) ABSTRACT

A method for forming a dispersible nonwoven substrate in an aqueous medium including: a) forming an aqueous nonwoven binder including a selected emulsion polymer wherein the polymer has been modified with a compound comprising a tri-substituted N-atom, the compound having a pKb of from 4 to 7; b) contacting a nonwoven substrate with the aqueous nonwoven binder; c) heating the contacted nonwoven to a temperature of from 120° C. to 220° C.; and d) immersing the contacted heated nonwoven in an aqueous medium having a final pH<5 is provided. A dispersible nonwoven substrate in an aqueous medium formed by the preceding method and a method for providing a dispersed nonwoven in an aqueous medium are also provided.

6 Claims, No Drawings

DISPERSIBLE NONWOVEN

This invention relates to a method for forming a dispersible nonwoven substrate. More particularly, the invention relates to a method for forming a dispersible nonwoven substrate in an aqueous medium including: a) forming an aqueous nonwoven binder including an emulsion polymer including, as copolymerized units: from 10% to 30% monoethylenically-unsaturated monoacid monomer by weight, based on the weight of the emulsion polymer, wherein the Tg of the emulsion polymer is from −20° C. to 30° C.; wherein the polymer has been modified with a compound comprising a tri-substituted N-atom, the compound having a $pK_b$ of from 4 to 7; b) contacting a nonwoven substrate with the aqueous nonwoven binder; c) heating the contacted nonwoven to a temperature of from 120° C. to 220° C.; and d) immersing the contacted heated nonwoven in an aqueous medium having a final pH<5 to provide a dispersible nonwoven in an aqueous medium. A dispersible nonwoven substrate in an aqueous medium formed by the preceding method and a method for providing a dispersed nonwoven in an aqueous medium are also provided.

U.S. Pat. No. 5,451,432 discloses a method for treating a flexible, porous substrate with a water-borne formaldehyde-free composition, the composition containing certain copolymerized ethylenically-unsaturated dicarboxylic acids, or derivatives thereof, wherein the binder is partially neutralized with a fixed base. An improved balance of dispersibility of a treated nonwoven substrate while maintaining desirable level of wet strength prior to dispersing the treated nonwoven substrate is still desired. It has been found that the present invention provides the desired properties.

In a first aspect of the present invention, there is provided a method for forming a dispersible nonwoven substrate in an aqueous medium comprising: a) forming an aqueous nonwoven binder comprising an emulsion polymer comprising, as copolymerized units: from 10% to 30% monoethylenically-unsaturated monoacid monomer by weight, based on the weight of said emulsion polymer, wherein the Tg of said emulsion polymer is from −20° C. to 30° C.; wherein said polymer has been modified with a compound comprising a tri-substituted N-atom, said compound having a $pK_b$ of from 4 to 7; b) contacting a nonwoven substrate with said aqueous nonwoven binder; c) heating said contacted nonwoven to a temperature of from 120° C. to 220° C.; and d) immersing said contacted heated nonwoven in an aqueous medium having a final pH<5 to provide a dispersible nonwoven in an aqueous medium.

In a second aspect of the present invention, there is provided a method for providing a dispersed nonwoven in an aqueous medium comprising immersing the dispersible nonwoven in an excess of an aqueous medium at a pH of >6.5.

In a third aspect of the present invention, there is provided a dispersible nonwoven in an aqueous medium formed by the method of the first aspect of the present invention.

In the method for forming a dispersible nonwoven substrate in an aqueous medium of the present invention by "aqueous" herein is meant a composition in which the continuous phase is water or, in the alternative, a mixture including predominantly water but also optionally including water-miscible solvent. By "dispersible" herein is meant that the nonwoven substrate can, under appropriate conditions, be caused to disintegrate into at least one of: smaller pieces, aggregates of fibers, individual fibers, and mixtures thereof.

By "nonwoven" herein is meant a fabric-like assembly of fibers typically in sheet or web form that is not a woven or knitted material. The nonwoven substrate includes paper; nonwoven fabrics; felts and mats; or other assemblies of fibers. The nonwoven substrate may include: cellulosic fibers such as cotton, rayon, and wood pulp; synthetic fibers such as polyester, glass, and nylon; bicomponent fibers; and mixtures thereof. Preferred is a predominant amount of fiber capable of engaging in hydrogen-bonding. More preferred is a nonwoven substrate including a predominant amount of cellulosic fiber. The nonwoven substrate may be formed by methods known in the art such as, for example, wet-laid, air-laid, spunbonding, and hydroentangling web formation. The fibers are typically selected so as their length and composition is not inimical to the ultimate dispersibility of the treated nowoven substrate In the method for forming a dispersible nonwoven substrate in an aqueous medium of the present invention an aqueous nonwoven binder is formed, the binder including an emulsion polymer, the emulsion polymer including, as copolymerized units: from 10% to 30% monoethylenically-unsaturated monoacid monomer by weight, based on the weight of the emulsion polymer, wherein the Tg (glass transition temperature calculated by the Fox equation) of the emulsion polymer is from −20° C. to 30° C.; wherein the polymer has been modified with a compound including a tri-substituted N-atom, the compound having a $pK_b$ of from 4 to 7. By "binder" herein is meant a composition including a polymer.

The aqueous nonwoven binder includes an emulsion polymer; that is, a polymer prepared by the addition polymerization of ethylenically-unsaturated monomers in an aqueous emulsion polymerization process. The emulsion polymer may be curable, that is it may undergo a chemical process to some extent, such as covalent bond formation, under the agency of added energy, most typically heating. The emulsion polymer includes, as copolymerized units, from 10% to 30%, preferably from 12% to 25%, by weight based on the weight of the emulsion polymer, monoethylenically-unsaturated monoacid monomer. Monoacid monomers include, for example, carboxylic acid monomers such as, for example, acrylic acid, methacrylic acid, crotonic acid, monomethyl itaconate, monomethyl fumarate, monobutyl fumarate. Preferred is acrylic acid.

The emulsion polymer optionally includes, as copolymerized units, from 0.01% to 0.75%, preferably from 0.2% to 0.6%, by weight based on the weight of the emulsion polymer, monoethylenically-unsaturated dicarboxylic acid monomer such as, for example, itaconic acid, fumaric acid, maleic acid; including their anhydrides, salts, and mixtures thereof. Preferred is itaconic acid.

The emulsion polymer includes, in addition to copolymerized monoacid and optional dicarboxylic acid monomers, at least one other copolymerized ethylenically unsaturated monomer such as, for example, a (meth)acrylic ester monomer including methyl (meth)acrylate, ethyl (meth)acrylate, butyl (meth)acrylate, 2-ethylhexyl (meth)acrylate, decyl (meth)acrylate, hydroxyethyl (meth)acrylate, hydroxypropyl (meth)acrylate, ureido-functional (meth)acrylates and acetoacetates, acetamides or cyanoacetates of (meth)acrylic acid; styrene or substituted styrenes; vinyl toluene; butadiene; vinyl acetate or other vinyl esters; vinyl monomers such as vinyl chloride, vinylidene chloride; and (meth)acrylonitrile. Preferred is ethyl acrylate. The use of the term "(meth)" followed by another term such as (meth)acrylate or (meth)acrylamide, as used throughout the disclosure, refers to both acrylates and methacrylates or acrylamides and methacrylamides, respectively. Preferably, monomers that may generate formaldehyde on polymerization or during subsequent processing such as, for example, N-alkylol (meth)acrylamide are excluded. The at least one other copolymerized ethylenically unsaturated monomer is selected so that the emulsion polymer will have a Tg within the required range.

In certain embodiments, the emulsion polymer may include from 0 to 2 wt %, or in the alternative, from 0 to 0.1 wt %, based on the weight of the polymer, of a copolymerized multi-ethylenically unsaturated monomer, although the level must be selected so as not to materially compromise the dispersibility of the nonwoven substrate treated with the aqueous nonwoven binder that includes the emulsion polymer. Multi-ethylenically unsaturated monomers include, for example, allyl (meth)acrylate, diallyl phthalate, 1,4-butylene glycol di(meth)acrylate, 1,2-ethylene glycol di(meth)acrylate, 1,6-hexanediol di(meth)acrylate, and divinyl benzene.

Mixtures of emulsion polymers having different compositions are also contemplated. For a mixture of two or more emulsion polymers, the copolymerized monoacid and optional dicarboxylic acid content and the Tg shall be determined from the overall composition of the emulsion polymers without regard for the number or individual composition of the emulsion polymers therein The emulsion polymerization techniques used to prepare the emulsion polymer are well known in the art such as, for example, as disclosed in U.S. Pat. Nos. 4,325,856; 4,654,397; and 4,814,373. Conventional surfactants may be used such as, for example, anionic and/or nonionic emulsifiers such as, for example, alkali metal or ammonium alkyl sulfates, alkyl sulfonic acids, fatty acids, copolymerizable surfactants, and oxyethylated alkyl phenols. Preferred are anionic emulsifiers. The amount of surfactant used is usually 0.1% to 6% by weight, based on the weight of total monomer. Either thermal or redox initiation processes may be used. Conventional free radical initiators may be used such as, for example, hydrogen peroxide, t-butyl hydroperoxide, t-amyl hydroperoxide, ammonium and/or alkali persulfates, typically at a level of 0.01% to 3.0% by weight, based on the weight of total monomer. Redox systems using the same initiators coupled with a suitable reductant such as, for example, sodium sulfoxylate formaldehyde, sodium hydrosulfite, isoascorbic acid, hydroxylamine sulfate and sodium bisulfite may be used at similar levels, optionally in combination with metal ions such as, for example iron and copper, optionally further including complexing agents for the metal. Chain transfer agents such as mercaptans may be used to lower the molecular weight of the polymers. The monomer mixture may be added neat or as an emulsion in water. The monomer mixture may be added in a single addition or in multiple additions or continuously over the reaction period using a uniform or varying composition. Additional ingredients such as, for example, free radical initiators, oxidants, reducing agents, chain transfer agents, neutralizers, surfactants, and dispersants may be added prior to, during, or subsequent to any of the stages. Processes yielding polymodal particle size distributions such as those disclosed in U.S. Pat. Nos. 4,384,056 and 4,539,361, for example, may be employed.

In another embodiment of the present invention, the emulsion polymer may be prepared by a multistage emulsion polymerization process, in which at least two stages differing in composition are polymerized in sequential fashion. Such a process usually results in the formation of at least two mutually incompatible polymer compositions, thereby resulting in the formation of at least two phases within the polymer particles. Such particles are composed of two or more phases of various geometries such as, for example, core/shell or core/sheath particles, core/shell particles with shell phases incompletely encapsulating the core, core/shell particles with a multiplicity of cores, and interpenetrating network particles. Each of the stages of the multi-staged emulsion polymer may contain monomers, surfactants, chain transfer agents, etc. selected from those disclosed herein-above for the emulsion polymer. For a multi-staged emulsion polymer, the copolymerized monoacid and dicarboxylic acid content and the Tg shall be determined from the overall composition of the emulsion polymer without regard for the number of stages or phases therein. The polymerization techniques used to prepare such multistage emulsion polymers are well known in the art such as, for example, U.S. Pat. Nos. 4,325,856; 4,654,397; and 4,814,373.

The calculated glass transition temperature ("Tg") of the emulsion polymer is from −20° C. to 30° C. Tgs of the polymers herein are those calculated using the Fox equation (T. G. Fox, *Bull. Am. Physics Soc.*, Volume 1, Issue No. 3, p. 123(1956)). That is, for example, for calculating the Tg of a copolymer of monomers M1 and M2, $$1/Tg(\text{calc.}) = w(M1)/Tg(M1) + w(M2)/Tg(M2),$$

wherein

Tg(calc.) is the glass transition temperature calculated for the copolymer w(M1) is the weight fraction of monomer M1 in the copolymer w(M2) is the weight fraction of monomer M2 in the copolymer Tg(M1) is the glass transition temperature of the homopolymer of M1

Tg(M2) is the glass transition temperature of the homopolymer of M2, all temperatures being in ° K.

The glass transition temperature of homopolymers may be found, for example, in "Polymer Handbook", edited by J. Brandrup and E. H. Immergut, Interscience Publishers. In any event the following homopolymer Tgs are to be used in the Fox equation calculation for the following polyacids: poly(methacrylic acid) Tg=185° C.; poly(acrylic acid) Tg=106° C.; poly(itaconic acid) Tg=154° C.; and poly (maleic anhydride) Tg=154° C.

The average particle diameter of the emulsion polymer particles is typically from 30 nanometers to 500 nanometers, preferably from 200 nanometers to 400 nanometers as measured by a Brookhaven Model BI-90 Particle Sizer supplied by Brookhaven Instrument Corp., Holtsville, N.Y.

The aqueous nonwoven binder of the present invention is preferably a formaldehyde-free composition. By "formaldehyde-free composition" herein is meant that the composition is substantially free from formaldehyde, nor does it liberate substantial formaldehyde as a result of drying and/or curing. In order to minimize the formaldehyde content of the composition it is preferred, when preparing the emulsion polymer of the present invention, to use polymerization adjuncts such as, for example, initiators, reducing agents, chain transfer agents, biocides, surfactants, and the like, which are themselves free from formaldehyde, do not generate formaldehyde during the polymerization process, and do not generate or emit formaldehyde during the treatment of a substrate. When low levels of formaldehyde are acceptable in the aqueous composition or when compelling reasons exist for using adjuncts which generate or emit formaldehyde, such compositions may be used.

The emulsion polymer is modified with a compound including a tri-substituted N-atom, the compound having a $pK_b$ of from 4 to 7. The $pK_b$ is determined in water at 20° C. by conventional methods. It is also contemplated that polymeric materials including a tri-substituted N-atom, the compound having a p$K_b$ of from 4 to 7 may be used. Such compounds include, for example, mono-, di-, and triethanolamine. polyvinyl pyrrolidone, acacia, amidated pectin, chitosan, gelatin, gum arabic. Preferred compounds are mono-, di-, and triethanolamine. The modification may be effected before, during, or after the subsequent step of contacting a nonwoven substrate, but before the step of heating the contacted nonwoven. The degree of modification with the compound including a tri-substituted N-atom, the compound having a p$K_b$ of from 4 to 7 is typically in the range of from 1% to 120%, preferably from 25% to 110%, more preferably from 75% to 105%, and most preferably from 95% to 105%, neutralization of the acid groups in the emulsion polymer on an equivalents basis.

The aqueous nonwoven binder may include, in addition to the emulsion polymer, conventional treatment components such as, for example, emulsifiers, pigments, fillers or extenders, anti-migration aids, curing agents, coalescents, surfactants, biocides, plasticizers, organosilanes, anti-foaming agents, corrosion inhibitors, colorants, waxes, other polymers, and anti-oxidants.

In the method for forming a dispersible nonwoven substrate in an aqueous medium of the present invention the nowoven substrate is contacted with the aqueous nonwoven binder. Typically the ratio of nonwoven binder to that of the contacted nonwoven substrate on a dry weight basis expressed as a percentage, also known as % add-on, is from 1% to 25%, preferably from 1% to 10%, selected depending on the strength of the nonwoven substrate and the desired end use. The nonwoven substrate is contacted with the aqueous nonwoven binder using conventional application techniques such as, for example, air or airless spraying, padding, saturating, roll coating, curtain coating, gravure printing, and the like. The nonwoven substrate may be contacted with the aqueous nonwoven binder so as to provide binder at or near one or both surfaces or distributed uniformly, or not, throughout the structure. It is also contemplated that the aqueous nonwoven binder may be applied in a nonuniform manner to one or both surfaces when a patterned distribution is desired.

In the method for forming a dispersible nonwoven substrate in an aqueous medium of the present invention the nowoven substrate that has been contacted with the aqueous nonwoven binder is heated to a temperature of from 120° C. to 220° C., preferably from 140° C. to 180° C., for a time sufficient to achieve an acceptable level of dryness and/or cure. The drying and curing functions may be effected in two or more distinct steps, if desired. For example, the composition may be first heated at a temperature and for a time sufficient to substantially dry but not to substantially cure the composition and then heated for a second time at a higher temperature and/or for a longer period of time to effect curing. Such a procedure, referred to as "B-staging", can be used to provide binder-treated nonwoven, for example, in roll form, which can at a later time be cured, with or without forming or molding into a particular configuration, concurrent with the curing process.

In the method for forming a dispersible nonwoven substrate in an aqueous medium of the present invention the contacted heated nowoven substrate is immersed in an aqueous medium having a final pH<5, preferably a final pH of from 3.0 to 4.99, to provide a dispersible nonwoven in an aqueous medium. By "final pH" herein is meant the pH (measured at 20° C.) of the aqueous medium in which the contacted heated nonwoven is immersed. If the final pH<5 is not achieved with the selected nowoven and aqueous medium and the amounts thereof, the pH is adjusted to the desired range by the addition of acidic material such as, for example, citric acid, prior to, during, or after the immersing step. The required pH of the aqueous medium is believed to contribute to a beneficial level of wet strength to the heated treated nonwoven and is also a suitable pH for certain compositions such as, for example, wipe solutions and lotions, in which the heated treated nonwoven may be stored. Typically the weight of aqueous medium is from 0.1 to 10, preferably from 0.5 to 5 times the weight of the contacted heated nonwoven substrate.

In the method for providing a dispersed nowoven in an aqueous medium of the present invention the dispersible nonwoven of the present invention is immersed in an excess of an aqueous medium at a pH of >6.5, preferably at a final pH of >6.5; preferably at a final pH of from 6.8 to 10.0. By "an excess of an aqueous medium" is meant herein that the weight of the aqueous medium is greater than the weight of the contacted heated nonwoven. The wet strength of the heated treated nonwoven is sufficiently reduced at the designated pH (measured at 20° C.) so as to facilitate its disintegration into at least one of: smaller pieces, aggregates of fibers, individual fibers, and mixtures thereof. Of course any mechanical forces that may be applied will aid in this dispersibility process, such as, for example, if the treated nonwoven were deposited in an excess of water at a pH of >6.5 and subjected to a shear force such as in a toilet flushing action.

A dispersible nonwoven in an aqueous medium herein is that formed by the methods for forming a dispersible nonwoven in an aqueous medium of the present invention.

ABBREVIATIONS USED

AA=acrylic acid
EA=ethyl acrylate
IA=itaconic acid
MMA=methyl methacrylate
Sty=styrene
DI water=deionized water
Test Methods:
  Emulsion polymers used: (compositions on a wt. basis)
Emulsion Polymer A=p(84 EA/1 Sty/15 AA)
Emulsion Polymer B=p(84 EA/1 Sty/14.5 AA/0.5 IA)
Emulsion Polymer C=p(59 EA/1 Sty/20 MMA/19.5 AA/0.5 IA)

EXAMPLES 1-6 AND COMPARATIVE EXAMPLES A-B

Formation and Evaluation of Dispersible Nonwovens

The following aqueous nonwoven binders were prepared. The order of addition was water, amine, mixed till dissolved; then emulsion polymer added with mixing.

Two Whatman 4 filter papers were weighed for each sample. Whatman 4 filter paper was dipped and padded using a Birch Brothers Padder (Birch Brothers Southern, Inc.) under 35 psi pressure, speed set at 5; and heated for 3 min. at 150° C. The treated paper was reweighed and add-on calculated using equation:

% add-on=(Final weight−Initial weight)*100%/(final weight)

TABLE 1.1

Formation of aqueous nonwoven binder

| Ex. | Substrate: Whatman 4 Formulations | % Emulsion polymer Solids | Water Grams | Selected Ethanolamine Grams | Emulsion polymer Grams | % add-on |
|---|---|---|---|---|---|---|
| Comp. A | Emulsion Polymer A | 43.1 | 226.80 | None | 23.20 | 4.03, 3.40 |
| 1 | Emulsion Polymer A + Monoethanolamine 98% | 43.1 | 225.50 | 1.30 | 23.20 | 4.94, 4.38 |
| 2 | Emulsion Polymer A + Diethanolamine 99% | 43.1 | 224.59 | 2.21 | 23.20 | 3.97, 4.12 |
| 3 | Emulsion Polymer A + Triethanolamine 98% | 43.1 | 223.64 | 3.10 | 23.20 | 5.33, 4.54 |
| Comp. B | Emulsion polymer B | 43.7 | 227.12 | None | 22.88 | 4.12, 3.58 |
| 4 | Emulsion polymer B + Monoethanolamine 98% | 43.7 | 225.85 | 1.27 | 22.88 | 4.91, 4.45 |
| 5 | Emulsion polymer B + Diethanolamine 99% | 43.7 | 224.94 | 2.18 | 22.88 | 4.57, 4.54 |
| 6 | Emulsion polymer B + Triethanolamine 98% | 43.7 | 224.00 | 3.12 | 22.88 | 5.41, 4.88 |

Evaluation of Dispersible Nonwovens

Emulsion Polymer A was coated on Whatman 4 filter paper. The tensile strength (mean of 9 determinations) was measured on nine 1 in.×4 in. strips CD after a 30 min soak in 50 g of Commercial aqueous lotion A and, separately, in 0.1 wt % TRITON™ X-100 (product of The Dow Chemical Company) tap water which had been adjusted to pH=7 with 110 ppm sodium bicarbonate.

TABLE 1.2

Tensile strengths of nonwovens at different pHs

| Example | Modifier | Tensile Strength pH = 4 | Std. Dev. | Tensile Strength pH = 7 | Std. Dev. |
|---|---|---|---|---|---|
| Comp. Ex. A | None | 600.1 | | 551.5 | |
| 1 | Monoethanol-amine (98%) | 2013.1 | 65.04 | 1690.9 | 163.35 |
| 2 | Diethanol-amine (99%) | 1655.1 | 51.23 | 1462.2 | 122.72 |
| 3 | Triethanol-Amine (98%) | 1339.6 | 73.30 | 1034.5 | 57.25 |

Examples 1-3, dispersible nonwoven substrates of the invention, exhibit enhanced tensile strength at pH<5 and a drop in tensile strength at pH>6.5, indicative of dispersibility of the nonwovens in contrast to the unmodified emulsion polymer (Comparative Example A) that exhibits no significant change in tensile strength over the designated pH range.

TABLE 1.3

Tensile strengths of nonwovens at different pHs

| Example | Modifier | Tensile Strength pH = 4 | Std. Dev. | Tensile Strength pH = 7 | Std. Dev. |
|---|---|---|---|---|---|
| Comp. B | None | 892.3 | 64.74 | 842.8 | 118.35 |
| 4 | Monoethanol-amine (98%) | 2425.6 | 182.93 | 2008.8 | 115.68 |
| 5 | Diethanol-amine (99%) | 2317.4 | 170.46 | 1962.1 | 161.34 |
| 6 | Triethanol-Amine (98%) | 1875.6 | 193.70 | 1511.5 | 119.12 |

Examples 4-6, dispersible nonwoven substrates of the invention, exhibit enhanced tensile strength at pH<5 and a drop in tensile strength at pH>6.5, indicative of dispersibility of the nonwovens in contrast to the unmodified emulsion polymer (Comparative Example B) that exhibits no significant change in tensile strength over the designated pH range.

What is claimed is:

1. A method for forming a dispersible nonwoven substrate in an aqueous medium comprising:
    a) forming an aqueous nonwoven binder comprising an emulsion polymer comprising, as copolymerized units: from 10% to 30% monoethylenically-unsaturated monoacid monomer by weight, based on the weight of said emulsion polymer, and at least one other copolymerized ethylenically unsaturated monomer wherein the Tg of said emulsion polymer is from −20° C. to 30° C.; wherein said polymer has been modified with a compound comprising a tri-substituted N-atom, said compound having a $pK_b$ of from 4 to 7;
    b) contacting a nonwoven substrate with said aqueous nonwoven binder;
    c) heating said contacted nonwoven to a temperature of from 120° C. to 220° C.; and
    d) immersing said contacted heated nonwoven in an aqueous medium having a final pH<5 to provide a dispersible nonwoven in an aqueous medium.

2. The method for providing said dispersible nonwoven substrate in an aqueous medium of claim 1 wherein said emulsion polymer further comprises, as copolymerized units, from 0.01% to 0.75% monoethylenically-unsaturated dicarboxylic acid monomer by weight, based on the weight of said emulsion polymer.

3. A method for providing a dispersed nonwoven in an aqueous medium comprising immersing the dispersible nonwoven of claim 1 in an excess of an aqueous medium at a pH of >6.5.

4. A dispersible nonwoven in an aqueous medium formed by the method of claim 1.

5. A method for providing a dispersed nonwoven in an aqueous medium comprising immersing the dispersible nonwoven of claim 2 in an excess of an aqueous medium at a pH of >6.5.

6. A dispersible nonwoven in an aqueous medium formed by the method of claim 2.

* * * * *